Feb. 1, 1944. S. E. RICHESON 2,340,345
COFFEE ROASTING MACHINE
Filed May 23, 1941 5 Sheets-Sheet 1
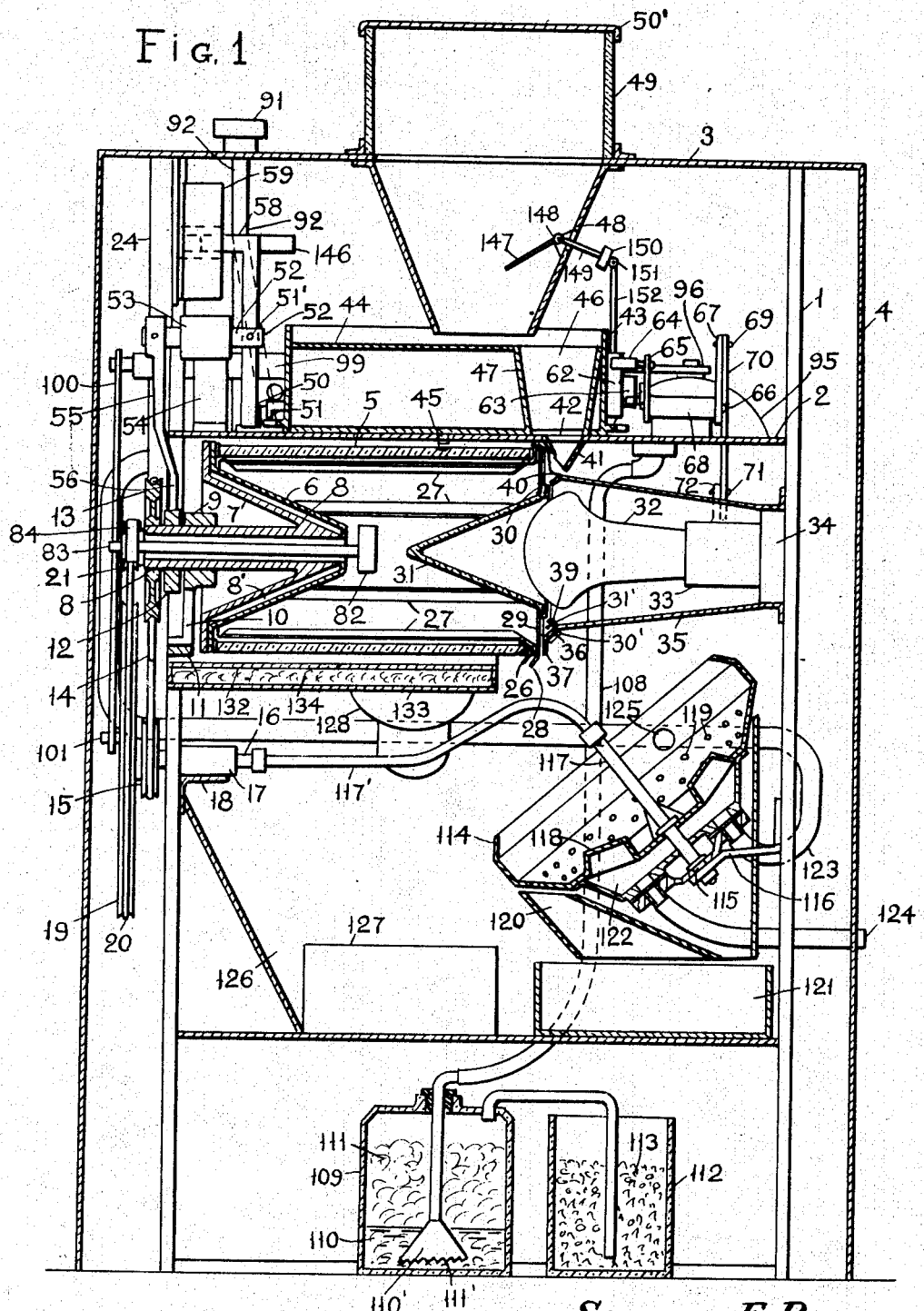
SANFORD E. RICHESON
INVENTOR.

Feb. 1, 1944.    S. E. RICHESON    2,340,345
COFFEE ROASTING MACHINE
Filed May 23, 1941    5 Sheets-Sheet 2
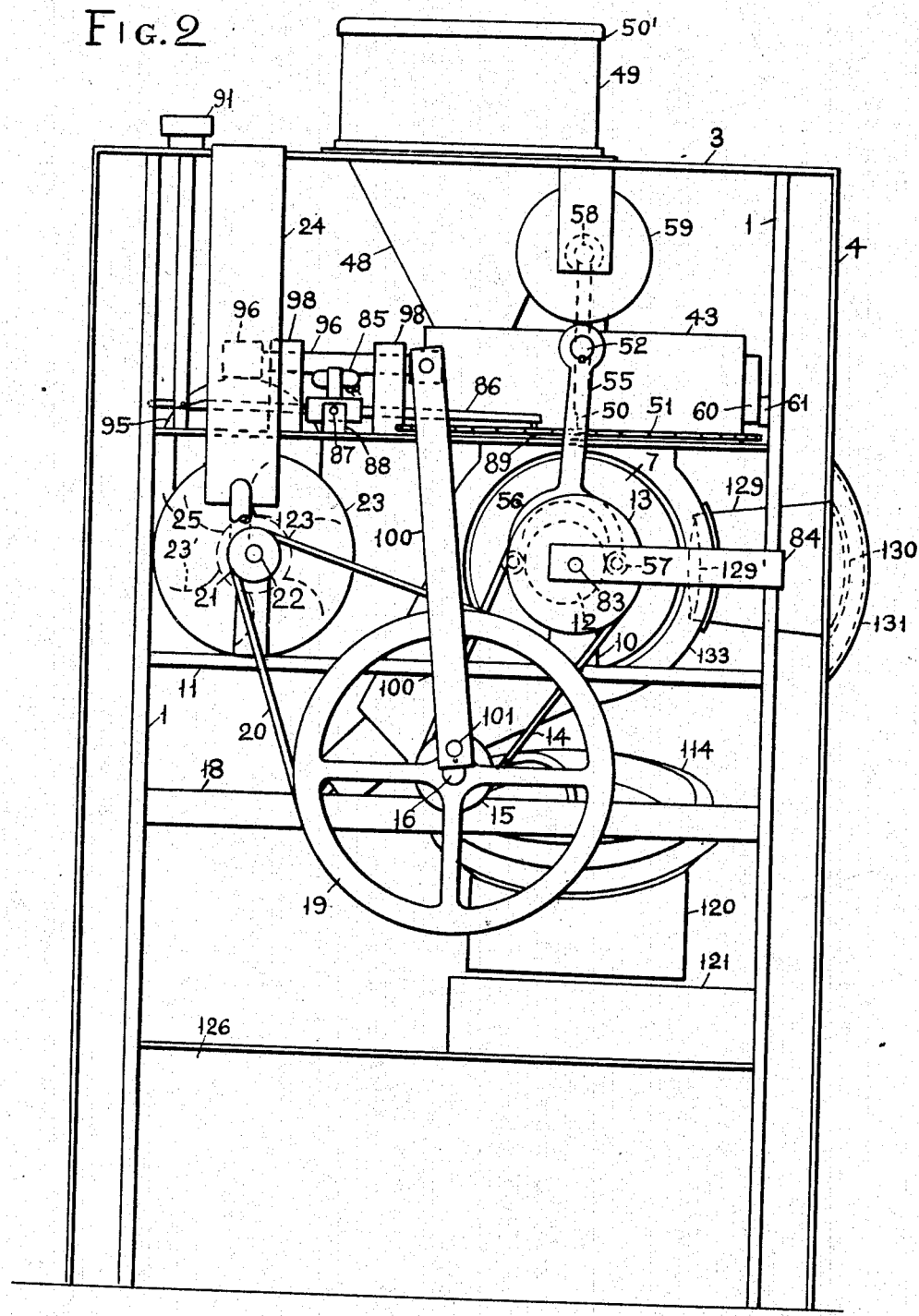
SANFORD E. RICHESON
INVENTOR.
BY John P. Wisroner
ATTORNEY Feb. 1, 1944.     S. E. RICHESON     2,340,345
COFFEE ROASTING MACHINE
Filed May 23, 1941     5 Sheets-Sheet 3
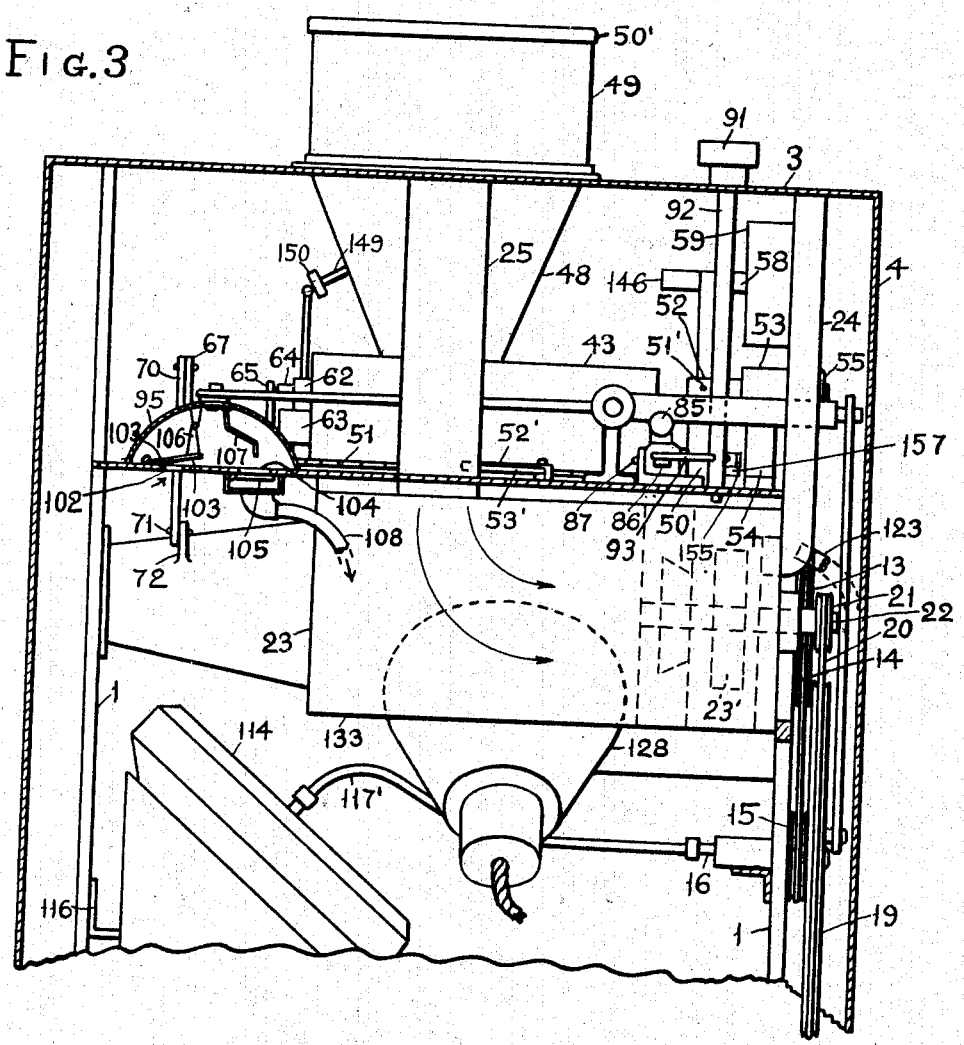
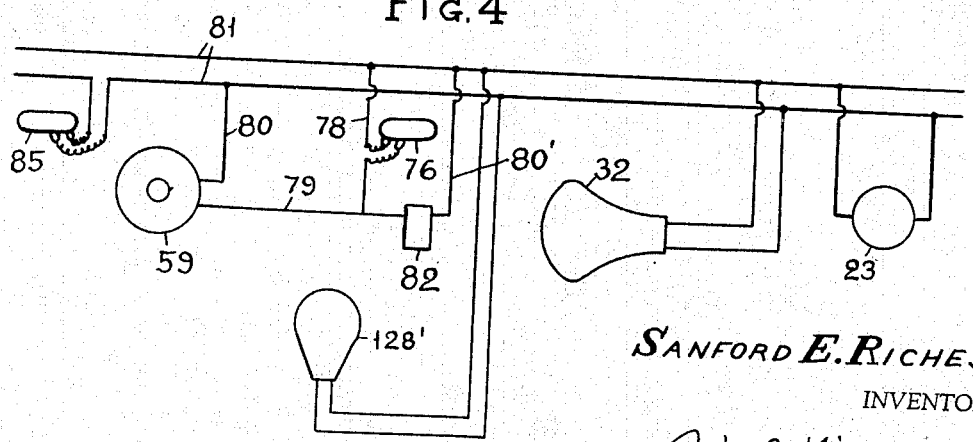
SANFORD E. RICHESON
INVENTOR.
BY John P. Wilkonow
ATTORNEY.

Feb. 1, 1944. S. E. RICHESON 2,340,345
COFFEE ROASTING MACHINE
Filed May 23, 1941 5 Sheets-Sheet 4

Sanford E. Richeson
INVENTOR.
BY John P. Nisonow
ATTORNEY

Feb. 1, 1944.  S. E. RICHESON  2,340,345
COFFEE ROASTING MACHINE
Filed May 23, 1941  5 Sheets-Sheet 5

SANFORD E. RICHESON
INVENTOR.

BY John P. Nissonow
ATTORNEY

Patented Feb. 1, 1944

2,340,345

UNITED STATES PATENT OFFICE 2,340,345

COFFEE ROASTING MACHINE

Sanford E. Richeson, Brooklyn, N. Y.

Application May 23, 1941, Serial No. 394,768

8 Claims. (Cl. 34—56)

My invention relates to coffee roasting machines and has particular reference to electrically operated automatic roasting machines.

My invention has for its object to provide an entirely automatic roasting machine in which green or raw coffee is automatically delivered into a roasting container when temperature in the chamber rises to a predetermined limit, the roasting process being continued until all the coffee beans in the container are heated to a roasting temperature, when the roasted product is automatically dumped into a cooling receptacle where coffee is separated from the chaff. By properly adjusting suitable temperature responsive devices, a perfect roast can be obtained.

Another object of my invention is to provide means for roasting coffee exclusively by radiated heat from a source placed entirely outside the roasting container, the radiant heat being directed onto the coffee beans preferably from two different directions, thereby obtaining the effect of cross-radiant heat. The heat rays pass through the walls of the container made of a material transparent to infra red rays. I have found that a more satisfactory roasting can be obtained by this method, the cross-radiant heat penetrating deeply into the coffee beans, while with the other roasting methods involving heat conduction and convection, the roasting is largely confined to the surface of the beans. Moreover, the radiant heat produces more uniform product and of a better quality compared to the roasting by convection, in the latter case a large amount of volatile aromatic substances being driven out of the coffee by the strong air current.

Another object of my invention is to provide an efficient smoke absorbing device for purifying the exhaust gases from the machine, so that the machine can be used in an ordinary store or similar confined place. I have found that the best results are obtained when the smoky exhaust gases are blown through water and glass wool or similar inert fibrous absorbing material.

I have found that smoke elimination is made more effective if pressure impulses are applied to the smoke under a head of a water column, thus causing fine dust particles to coalesce into large lumps, rendering the glass wool absorbing.

Still another object of my invention is to provide an arrangement whereby the machine cannot be stopped with green or partly roasted coffee in the roasting chamber. This is accomplished in my machine by the use of a switch control device, which, when set for disconnecting the switch, retains the switch closed, however, until the coffee in the roasting container is fully roasted and discharged.

My invention is more fully described in the accompanying specification and drawings, in which:

Fig. 1 is a sectional elevational view of my machine;

Fig. 2 is an elevational view from the driving side with one wall of the casing removed;

Fig. 3 is a fractional elevational view from another side;

Fig. 4 is a diagram of electrical connections;

Figure 5:
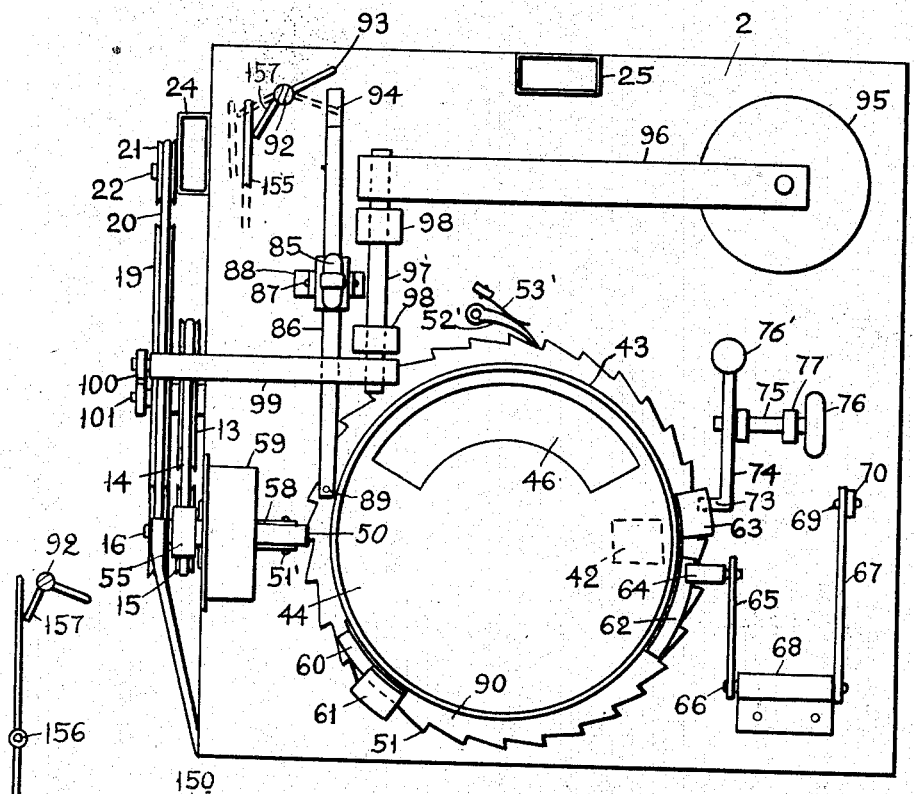
Fig. 5 is a top plan view with the cover removed.

My coffee roasting machine consists of a frame 1 preferably made of metal bars and having a top plate 2 below a cover plate 3. The latter rests on an outer casing or housing 4, preferably made of sheet metal or "Bakelite" and having an attractive finish, being enameled or otherwise decorated.

A roasting cylinder 5 is placed horizontally under the plate 2. It is preferably made of a heat resistant transparent material, such as glass "Pyrex" or similar glass having high silica content.

The front end of the cylinder rests against the flange of a cone-shaped end bell 6, preferably made of sheet metal and in turn resting against the flange of an end member 7. A clearance 8' is formed between the end bell and the end member, air in the clearance forming heat insulation for the end portion of the cylinder. The end member 7 is integrally connected with a tubular shaft 8 journaled in a bearing 9 on a bracket 10 mounted on a cross bar 11. The outer end of the shaft mounts an eccentric cam 12 and a pulley 13 connected by a V-belt 14 or similar flexible driving member with a pulley 15 on an intermediate shaft 16 journaled in a bearing 17 mounted on a cross bar 18. A large pulley 19 is also mounted on the shaft 16 and is connected by a belt 20 or similar flexible member with a small driving pulley 21 on the end of the shaft 22 of an electric motor 23. The motor is preferably of an enclosed type with an internal cooling fan 23' blowing air through an exhaust pipe 24 and intake pipe 25. With such an arrangement of pulleys it is possible to drive the roasting cylinder at a relatively slow speed.

A metal ring 26 is placed against the rear end of the cylinder 5, supporting bent-over ends of metal bars 27, extending in an approximately radial direction and serving as stirrers for the coffee beans in the cylinder. The front ends of the bars 27 are bent inward, being attached to the cone 6. The bars 27, besides stirring the coffee, complete a skeletal structure supporting the glass cylinder 5. A ring 28 is attached to the ring 26 over the ends of the stirring bars 27 and is provided with arms or spokes 29 extending to an inner ring 30. The latter supports the flange of an inverted cone 31 preferably made of a heat resistant glass such as "Pyrex" which is transparent to infra red rays from a heating electric lamp 32.

The lamp is fitted in a socket 33 supported on the frame 1 inside of a short tubular member 34. The tubular member forms a bearing for a conical tube 35 enclosing the lamp. The tube acts as a reflector for the heat rays of the lamp, directing them against the glass cone 31. The large rear end of the tube 35 is tapered outward at 36 and has a flange 37 closely approaching the ring 28. A second conical flange 39 extends from the tube 35 toward the rear end of the cone 31. Small clearances are provided between stationary parts and the rear end of the cylinder so as to prevent the escape of the coffee beans from the cylinder. The amount of air admitted into the cylinder may be regulated by a shutter 30' sliding over holes 31' in the flange 36.

The tapered portion 36 has an opening 40 at one place registering with a bottom opening of a hopper 41 when the tube 35 is turned in a corresponding position. The hopper 41 extends from an opening 42 in the plate 2 under a rotary feeder 43. The feeder represents a tubular cylinder with a top plate 44 placed substantially below the upper edge of the cylinder and is mounted for rotation on a short shaft 45. The feeder has an arcuate transverse opening 46 between walls 47, passing under the lower end of an upper hopper 48 extending from a glass tube 49 on top of the machine with a cover 50', the tube 49 and the hopper 48 containing green or raw coffee beans. The lower end of the hopper 48 is raised above the plate 44 in order to prevent crushing of the beans by the edges of the hopper. The raised edges of the feeder 43 prevent the escape of coffee from the feeder to the outside. The feeder is rotated by a pawl 50 engaging teeth 51 on the lower flange of the feeder. The pawl is pivoted at 51' in the forked end of a shaft 52 journaled in a bearing 53 supported on a bracket 54.

An arm 55 is keyed to the outer end of the shaft 52 and has a fork 56 with rollers 57 engaging the sides of the cam 12. The cam causes the forked arm 56 to oscillate, thereby oscillating the pawl 50. The latter engages the teeth 51 when an armature 58 on the upper end of the pawl is attracted by a magnet or solenoid 59. A dog 52' with a spring 53' prevents back slipping of the feeder. A counterweight 146 keeps the armature away from the magnet 59.

Figure 6:
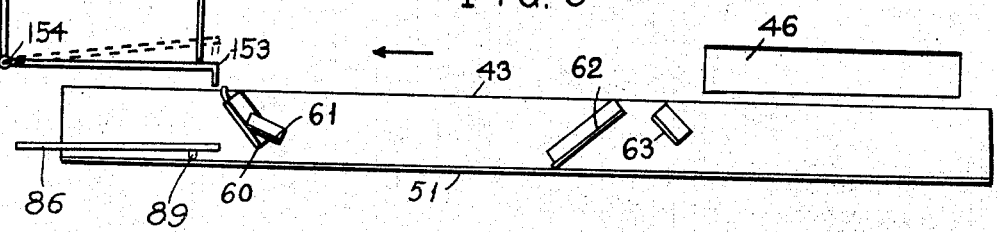
Fig. 6 is a developed view of the cams controlling operations of the machine.

The peripheral surface of the feeder cylinder is provided with cams 60, 61, 62 and 63 shown more clearly in Fig. 6, which represents developed view of the peripheral surface of the feeder and developed view of the opening 46. Cams 60 and 62 act on a roller 64 on the end of an arm 65 connected by a shaft 66 with an arm 67, the shaft 66 being journaled in a bearing 68 mounted on the plate 2. The free end of the arm 67 is pivotally connected at 69 to the upper end of a link 70 whose lower end is pivoted at 71 to lug 72 on the rotary cylinder 35. The arms and the link are so proportioned that the cams 60 and 62 alternately turn the tube 35 so as to bring the opening 40 to the bottom or to the top of the cylinder 5, thereby discharging the roasted coffee or charging raw coffee into the cylinder 5.

The cams 61 and 63 are engaged by a lug 73 on an arm 74 connected with a shaft 75 supporting a mercury switch 76 and journaled in bearings 77 on the plate 2. The switch is normally closed by a weight 76', closing the circuit for the solenoid 59 (see also the diagram in Fig. 4) by leads 78, 79 and 80. The cams 61 and 63 open the switch. The solenoid is also connected with the bus bar line 81 by a thermostatic switch 82 which closes the circuit through leads 79, 80 and 80' when a certain predetermined temperature is reached in the roasting cylinder 5. The thermostatic switch is mounted on a rod 83 extending through the hollow shaft 8 and supported at the end in a bracket 84 extending from the frame 1.

The main circuit may be disconnected by a mercury switch 85 mounted on an arm 86 pivoted at 87 between brackets 88 resting on the plate 2. The inner end of the arm 86 is longer and heavier than the outer end, so that it tends to turn the switch into a disconnecting position. The switch stays closed, however, the arm 86 being supported by a pin 89 at its end, the pin sliding over the inner surface of the feeder flange. The flange is provided with a hole into which the pin 89 falls, allowing the arm 86 to turn and the switch 85 to be disconnected. If it is desired to continue operation of the machine, then the outer end of the arm 86 is depressed by turning a knob 91 on a vertical shaft 92, thus causing a lug 93 on the shaft to climb on a tapering end 94 of the arm 86 and depressing the latter. For stopping the machine, the knob 91 is turned to the left, removing the lug from the arm 86. The switch 85 will then be turned into an open position when the pin 89 meets the hole in the flange 90. The hole is so placed that the machine stops at the end of the coffee discharging operation and before the feeder is opened for charging fresh coffee into the cylinder 5.

The smoke which collects inside the casing is exhausted by a positive reciprocating pump. It consists of a bellows 95 made of an elastic material such as rubber and operated by an arm 96 attached to the end of a shaft 97 journaled in bearings 98 mounted on the plate 2. The other end of the shaft 97 is fastened to the end of a bar 99 pivotally connected to the end of a crank bar 100 pivotally mounted on a crank 101 extending from the pulley 19. The crank bar reciprocates during rotation of the pulley 19, oscillating the shaft 97 and operating the bellows 95. The bellows is mounted on the plate 2 which has two holes, an intake hole 102 with an intake valve 103, and an exhaust hole 104 with a valve 105. The valves are preferably made of rubber so that they will seal the ports even if small dust particles may be lodged under them. The casing or housing 4 is air-tight and collects smoke emerging from the cylinder through clearances between parts 28, 37 and openings between the spokes 29, the smoke being then drawn through the hole 102.

In view of the fact that the smoke may contain a certain amount of tars which may cause sticking of the valves, means is provided for their positive operation. The intake valve 103 is provided for this purpose with wire loops 106 which pull the valve off its seat at the end of the suction movement of the bellows. The intake valve is positively opened at the end of the exhaust movement of the bellows by a wire or rod 107.

The smoke is forced through a flexible tube 108 into a smoke collector or eliminator consisting of a container 109 with water 110 or other suitable liquid at the bottom and filled with glass wool 111 or other suitable porous or fibrous inert material. A bell 110', open at the bottom, is provided at the end of the tube 108 with teeth or serrations 111'. I have found that glass wool very effectively absorbs smoke particles, particularly in view of the fact that the smoke, being subjected to high pressure, surges in the exhaust pipe caused by the reciprocating action of the pump bellows, and under static head of water column, have tendency to coalesce into larger particles under the bell, escaping all around its serrated edge into water, where they are readily adsorbed by the glass wool.

An additional container 112 may be provided with activated carbon 113 for absorbing odorous gases from the exhaust.

The roasted coffee from the cylinder 5 is discharged into a cooling pan 114 mounted on a shaft 117 rotatively supported in a bearing 115 on a bracket 116 extending from the frame 1. The pan is rotated by a flexible shaft 117' connected with the shaft 16 or with pulley on belt 14. The pan has projections 118 for stirring the coffee and holes 119 for removing chaff which falls through a chute 120 into a chaff pan 121. Cooling air is admitted into a chamber 122 under the pan by a pipe 123 from the motor fan, the hot air being exhausted through a pipe 124 to the outside.

A small opening 125 is provided in the peripheral wall of the pan 114 through which roasted and cooled coffee gradually escapes into a compartment 126. The roasted coffee is removed from this compartment through a door 127.

A lamp 128' in a reflector 128 is provided at the side of the cylinder 5 for producing cross-radiant heat and also for illuminating its contents. The cylinder can be observed through a tube 129 inserted into the wall 4 (Fig. 2) and extending to the cylinder 5 where a condenser or magnifying lens 129' may be provided. The outer end of the tube 129 is covered with a convex glass plate 130. A second glass plate 131 is placed at a distance from the first plate 130 in order to protect the observers from being burned, since the plate 130 may become very hot. The cylinder 5 is surrounded with an insulating cylinder consisting of metal shells 132 and 133 with an insulation 134 therebetween.

Figure 7:
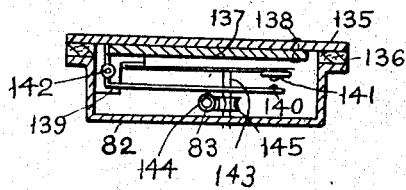
Fig. 7 is a detail view of a thermostatic switch.
Figure 8:
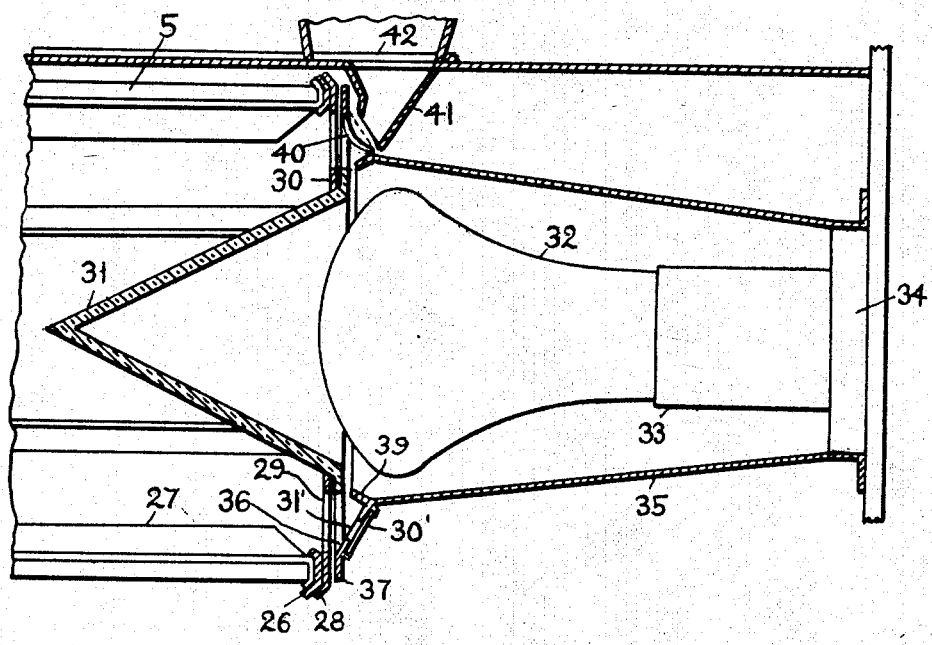
Fig. 8 is an enlarged detail view of the roasting cylinder.

The thermostatic switch is shown in detail in Fig. 7. It consists of a housing 82 made of metal and mounted on the inner end of the rod 83. An iron cover 135 of the housing is separated from the housing by an asbestos gasket 136. A brass bar 137 is welded or riveted to the cover at 138 and engages a contact lever 139 pivoted at 142 with a contact point 140 engaging a contact point 141 when the temperature in the housing reaches a predetermined point. The position of the point 141 can be regulated by a screw 143. The screw is turned by a worm 144 extending to the outside of the machine through a hole in the rod 83 and engaging a worm gear 145 on the screw 143.

Coffee beans pass over the plate 135, transmitting heat by conduction to the brass bar 137, so that the switch is closed only when the beans reach the desired roasting temperature.

The operation of my machine is as follows:
Green coffee is placed in the hopper 48 and glass container 49. The coffee spreads over the top of the feeder and fills the cavity or recess 46. The coffee cannot reach the roasting cylinder 5, however, since the recess 46 does not register with the opening 42. The opening 40 is now at the top, being placed there by the cam 62 upon completion of the preceding discharging operation. Cam 63 at the beginning of the operation keeps the solenoid circuit disconnected until it is closed by the thermostat.

The main switch 85 is closed by turning the knob 91, thereby depressing the outer end of the arm 86 and removing pin 89 from the corresponding hole in the flange of the feeder. The current will energize the motor 23 and the heating lamp 32 but the feeder will not rotate since the solenoid 59 will not be energized, the switch 76 and the thermostatic switch 82 being open. As soon as the temperature in the roasting cylinder 5 reaches a desired temperature, however, the thermostatic switch will close the circuit for the solenoid. The latter will attract the armature 58, bringing the pawl 50 into engagement with the teeth 51 of the feeder flange. The pawl is oscillated continuously by the rotation of the eccentric 12 on the cylinder shaft 8 through the forked arm 56 and will rotate the feeder when in engagement with the teeth 51.

As shown in Figs. 5 and 6, soon after the feeder starts its rotation, the recess 46 will pass over the opening 42 in the plate 2. The coffee will then flow into the hopper 41 and into the cylinder 5 through the opening 41. The thermostat will be cooled off by the fresh coffee but the circuit for the solenoid will be kept closed by the mercury switch 76, turned down by the weight 76'. The feeder will continue rotation, discharging the coffee into the roasting cylinder until the opening or recess 46 moves out of register with the opening 42. Rotation will continue until the cam 61 reaches the switch 76 and opens the same, thereby deenergizing the solenoid and stopping rotation the thermostatic switch being also opened by the cooling effect of the raw coffee.

The feeder will now stand still while temperature of the coffee gradually reaches the roasting point. As soon as the right temperature is reached, the thermostat will close the circuit for the solenoid, starting again rotation of the feeder. Cam 60 will turn the opening 40 downward for discharging the roasted coffee, this operation continuing until the cam 62 turns the opening upward again. Rotation will continue if the thermostat is still at the right temperature or will stop until this temperature is reached. It will stop in any event, however, if the knob 91 is turned to the left releasing the bar 86 and allowing the pin 89 to engage the hole in the feeder flange.

The roasted coffee can be removed from the compartment 126 by opening the door 127. The pan 121 with the accumulated chaff can be also removed for cleaning. The containers 109 and 112 can be cleaned and refilled from time to time. These containers may be kept at a distance from the machine, in the cellar if so desired.

With my machine and roasting method it is possible to obtain a very fine roast due principally to the very low loss of moisture content in the beans. The use of radiant heat exclusively eliminates the necessity of blowing air through the roasting chamber, so that there is no excessive drying of the beans, there being only natural rise of heat and steam. There is a small clearance at the end of the cylinder for mitting a small quantity of air for replacing steam rising from the beans, thus preventing appearance of spots on the beans. The amount of air admitted into the cylinder is controlled by this clearance. A screen may be also provided at the lamp housing.

My machine is entirely automatic and may be left in operation unattended until all the raw coffee in the hopper 48 is roasted.

In order to stop the operation of the machine when the supply of raw coffee is exhausted, an automatic stopping device is provided for turning off the shaft 92. The device consists of a vane 147 pivotally supported at 148 in the lower portion of the hopper 48 (the vane may be preferably made to extend to the bottom of the hopper). The vane has an arm 149 extending to the outside of the hopper through a suitable slot in its wall. A weight 150 is placed on the arm 149 to keep it down so as to raise the vane 147. The arm is pivoted at 151 to a rod 152 engaging a hook 153 pivoted at 154 to a lever 155. The lever is pivoted at 156 to the plate 2, its other end engaging a lug 157 on the rod 92.

The weight of the raw coffee in the hopper normally keeps the vane 147 down and the rod 152 with the hook 153 raised, leaving the lever 155 inoperative. If, however, the supply of the raw coffee is exhausted, the vane 147 is allowed to rise under action of the weight 150, lowering the rod 152 and hook 153. The latter becomes engaged by the cam 60 on the feeder, pushing the lever 155 until its outer end engages the lug 157, turning the rod 92 and moving the lug 93 away from the arm 94. The arm 94 is then released so that the pin 89 can enter the hole in the flange 90. For starting the machine after it has been stopped, the rod 92 is turned by hand until the lug 93 engages the bar 94, raising the pin 89 and releasing the feeder. The pin 157 at the same time turns the lever 155, moving the hook 153 to its original position. The machine then stops after the next discharging operation. The time required for the feeder 43 to move after the main switch is opened by the handle 91 is such that the last batch of the roasted coffee in the pan 114 is cooled off and fully discharged through the opening 125, periodically passing over the box 127. The cam 60 extends above the upper edge 43 and is so made that it is resiliently deflected by the lug 153 after turning the arm 155, allowing the movement to continue until the pin 89 engages the hole in the flange 5.

It is understood that my coffee roasting machine may be further modified without departing from the spirit of the invention as set forth in the appended claims.

I claim as my invention:

1. A coffee roasting machine comprising a framework, a hollow cylinder rotatively mounted at one end in the framework, a concave closure partly covering the other end of the cylinder made of a material transparent to radiant heat, means to admit raw coffee into the cylinder, a heat radiating electric lamp in the framework partly entering the concave closure for roasting the coffee in the cylinder by radiation, means to rotate the cylinder, and means to discharge the roasted coffee from the cylinder upon completion of the roasting process.

2. A coffee roasting machine comprising a framework, a hollow cylinder rotatively mounted at one end in the framework, a closure partly covering the other end of the cylinder, means to admit raw coffee into the cylinder, a stationary radiant heating means outside the cylinder and including a radiant heating element adjacent the closure for roasting the coffee by radiation through the walls of the cylinder, means to rotate the cylinder, and means to discharge the roasted coffee from the cylinder upon completion of the roasting process, the end portion of the cylinder being in the form of a cone directed inward with its apex, the closure being in the form of a cone directed inward with its apex toward the first apex and being adapted to transmit said radiant heat to the inside of the cylinder.

3. A coffee roasting machine comprising a framework, a hollow cylinder rotatively mounted at one end in the framework, a closure for the free end of the cylinder with an opening for charging raw coffee into the cylinder and discharging the roasted coffee therefrom, a feeder movably supported above the cylinder, means to admit raw coffee into the feeder, the framework having a hopper under the feeder in communication with the cylinder opening, the feeder having an opening registering with the hopper in a charging position, means to rotate the feeder, thermostatic means in the cylinder to render the feeder rotating means operative when the temperature in the cylinder reaches a predetermined degree, means to maintain feeder rotation after the cylinder has been cooled off by the raw coffee, means to stop rotation of the feeder until the temperature in the cylinder reaches a predetermined degree when said thermostatic means becomes operative, and means to discharge the roasted coffee from the cylinder.

4. A coffee roasting machine comprising a framework, a hollow cylinder rotatively mounted at one end in the framework, means to rotate the cylinder, a feeder rotatively supported in the framework above the cylinder, a container for raw coffee above the feeder, means to rotate the feeder, the feeder in a charging position being adapted to admit coffee from the container into the cylinder, an electric heating element outside the cylinder for roasting coffee in the cylinder by radiant heat through the walls of the cylinder, a thermostatic means in the cylinder for starting said feeder rotating means when temperature reaches a predetermined degree, means to maintain feeder rotation when temperature is lowered by the admittance of raw coffee into the cylinder, and means controlled by the feeder for discharging roasted coffee from the cylinder.

5. A coffee roasting machine comprising a framework, a hollow cylinder rotatively mounted at one end in the framework, a closure for the free end of the cylinder with an opening for charging raw coffee into the cylinder and discharging the roasted coffee therefrom, a feeder movably supported above the cylinder, means to admit raw coffee into the feeder, the framework having a hopper under the feeder in communication with the cylinder opening, the feeder having an opening registering with the hopper in a charging position, means to rotate the feeder, thermostatic means to render the feeder rotating means operative when the temperature in the cylinder reaches a predetermined degree, means to maintain feeder rotation for a predetermined period of time after the cylinder has been cooled off by the raw coffee, means to thereafter render said feeder rotating means inoperative until the temperature in the cylinder reaches a predetermined degree when said thermostatic means becomes operative, means to discharge the roasted coffee from the cylinder, a manually controlled means to disconnect the supply of power to the machine, and means to render said manually controlled means inoperative until the discharge of the roasted coffee from the cylinder is complete.

6. A coffee roasting machine comprising a framework, a hollow cylinder rotatively mounted at one end in the framework, an electric motor in the framework, means to rotate the cylinder by the motor, means operated by the motor to charge raw coffee into the cylinder, means to roast the coffee in the cylinder, means to discharge the roasted coffee from the cylinder, electromagnetic means including a circuit to control the coffee charging and discharging means, a lever movably supported in the framework, a switch on the lever included in said circuit of the electromagnetic means for controlling said electromagnetic means, means to move the lever into a position for opening the switch, means to prevent the switch opening movement of the lever until the coffee is discharged from the cylinder, and manually operable means to render the switch opening means fully inoperative.

7. A coffee roasting machine comprising a framework, a hollow cylinder rotatively mounted at one end in the framework, means to rotate the cylinder, a cylindrical feeder supported in the framework above the cylinder for rotation on a vertical axis, the framework having a hopper connecting the feeder with an opening in the cylinder, means to admit raw coffee into the feeder, the feeder having an opening registering with the hopper in a charging position of the feeder, means to rotate the feeder by the cylinder rotating means, electromagnetic means to connect and disconnect the feeder with the cylinder rotating means, a thermostatic switch in the cylinder for energizing the electromagnetic means to connect the feeder with the cylinder rotating means when the cylinder temperature reaches a predetermined degree, thereby admitting raw coffee into the cylinder, means to deenergize the electromagnetic means to stop rotation of the feeder until coffee in the cylinder reaches said predetermined temperature, the cylinder having an opening for admitting raw coffee and for discharging the roasted product, means to open and to close the opening, and a plurality of cams on the feeder for controlling the cylinder opening and closing means.

8. A coffee roasting machine comprising a framework, a hollow cylinder rotatively mounted at one end in the framework, means to rotate the cylinder, a cylindrical feeder supported in the framework above the cylinder for rotation on a vertical axis, the framework having a hopper connecting the feeder with an opening in the cylinder, means to admit raw coffee into the feeder, the feeder having an opening registering with the hopper in a charging position of the feeder, ratchet teeth on the periphery of the feeder, a pawl movably supported at the feeder adapted to engage the teeth, means to reciprocate the pawl for rotating the feeder, an electromagnetic means for controlling the pawl reciprocating means, the feeder being adapted to deliver raw coffee into the cylinder, means for rendering the electromagnetic means operative when temperature in the cylinder reaches a predetermined degree, means to deenergize the electromagnetic means, thereby stopping the feeder until temperature of the raw coffee reaches said predetermined degree, means for discharging the coffee from the cylinder upon completion of the roasting operation, and means controlled by the feeder for operating said discharging means.

SANFORD E. RICHESON.